(12) United States Patent
Shalkey

(10) Patent No.: US 7,276,194 B2
(45) Date of Patent: Oct. 2, 2007

(54) METHOD AND APPARATUS FOR EXTRUDING A CERAMIC MATERIAL

(75) Inventor: Mark A Shalkey, Corning, NY (US)

(73) Assignee: Corning Incorporated, Corning, NY (US)

( * ) Notice: Subject to any disclaimer, the term of this patent is extended or adjusted under 35 U.S.C. 154(b) by 579 days.

(21) Appl. No.: 10/651,553

(22) Filed: Aug. 29, 2003

(65) Prior Publication Data

US 2005/0046072 A1     Mar. 3, 2005

(51) Int. Cl.
*B29C 47/68* (2006.01)
*B29C 47/08* (2006.01)
*B01D 46/24* (2006.01)

(52) U.S. Cl. .......... 264/177.12; 264/630; 264/631; 425/382.4; 425/197; 425/198

(58) Field of Classification Search .......... 264/177.12, 264/629, 177.13, 177.11, 177.14, 630, 631, 264/632, 634; 425/197, 382.4
See application file for complete search history.

(56) References Cited

U.S. PATENT DOCUMENTS

| | | | |
|---|---|---|---|
| 2,684,919 A | 7/1954 | Berry et al. .................. 117/76 |
| 3,885,977 A | 5/1975 | Lachman et al. ............. 106/62 |
| 3,888,963 A * | 6/1975 | Orso et al. ............... 264/211.11 |
| 4,551,295 A | 11/1985 | Gardner et al. ......... 264/177 R |
| 4,574,459 A * | 3/1986 | Peters ........................ 29/527.4 |
| 4,839,120 A * | 6/1989 | Baba et al. .................. 264/102 |

OTHER PUBLICATIONS

Merriam-Webster's Collegiate Dictionary, tenth edition, Merriam-Webster, Inc., 1998, pp. 435.*
www.johnsonscreens.com; Screen Construction.

* cited by examiner

*Primary Examiner*—Christina Johnson
*Assistant Examiner*—Matthew J. Daniels
(74) *Attorney, Agent, or Firm*—Randall S. Wayland; Kees van der Sterre; Kevin M. Able

(57) ABSTRACT

A method is provided for manufacturing a thin-walled honeycomb ceramic substrate by extruding a plasticized ceramic batch material through a filter screen having wedge shaped filter wires to remove foreign particulate and agglomerated batch material. The filter wires are supported by a set of support wires attached substantially perpendicular to the filter wires. The support wires are may also be advantageously wedge shaped. The filter screen of the present invention may have a wear resistant layer at the surface of the screen, typically a boride or a nitride. The wear resistant coating may also be a nickel-based coating.

4 Claims, 6 Drawing Sheets

METHOD AND APPARATUS FOR EXTRUDING A CERAMIC MATERIAL

BACKGROUND OF THE INVENTION

1. Field of the Invention

The present invention is directed to a method of extruding a ceramic material, and more specifically toward a method of filtering a plasticized ceramic batch material during the extrusion of a honeycomb ceramic substrate.

2. Technical Background

A method for extruding structures of complex cross section from plasticized mixtures of inorganic powders and suitable binders is disclosed in U.S. Pat. No. 4,551,295 to Gardner et al. In this process a cordierite batch mixture consisting of inorganic clay, talc and alumina powders is combined with organic binders and water, and the resulting mixture is plasticized in the extruder. The plasticized batch mixture is then fed to a honeycomb extrusion die mounted on the end of the extruder. The resulting honeycomb substrates find significant use as liquid metal filter media, and as substrates for emission control devices, both in industrial applications and particularly in the automotive industry for automobile catalytic converters.

Cordierite honeycomb substrates have long been preferred for use as substrates to support catalytically active components for catalytic converters on automobiles, in part due to cordierite ceramics' high thermal shock resistance. The production of cordierite ($2MgO.2Al_2O_3.5SiO_2$) ceramics from mineral batches containing sources of magnesium, aluminum and silicon such as clay and talc is well known. Such a process is described in U.S. Pat. No. 2,684,919. U.S. Pat. No. 3,885,977 discloses the manufacture of thermal-shock-resistant cordierite honeycomb ceramics from clay/talc batches by extruding the batches and firing the extrudate to provide ceramics with very low expansion coefficients along at least one axis.

Increasingly stringent clean air regulations have required catalytic converters used to reduce the pollution emissions of such sources as gasoline and diesel engines to become more efficient. This tightening of requirements has lead to the development of honeycomb ceramic catalytic converter substrates with exceptionally thin walls (webs) between individual cells included in the honeycomb substrate.

Manufacturers work continuously to optimize the characteristics of cordierite substrates to enhance their utility as catalyst carriers. Specifically, manufacturers continually strive to develop cordierite honeycomb substrates that possess smaller and smaller web or wall sizes. Demand for cordierite monoliths having very thin webs is increasing in response to legislation requiring higher conversion efficiencies in catalytic converters for the automobile market. Thinner webs reduce the mass of the substrate resulting in faster light-off times. In addition, higher geometric surface areas may be achieved without an increase in the mass of the substrate. Another advantage of thin walled substrates is that a lower back pressure may be achieved.

The production of honeycomb substrates with very thin webs is, however, very difficult when compared with substrates having a more conventional geometry. It has been found that when conventional extrusion apparatus are used to produce ceramic honeycombs with web wall thicknesses of less than about 0.004 inches (0.01 cm), an unacceptably high number of breaks in the web of the cellular extrudate (i.e., areas containing no ceramic material) are observed in the extruded product. It is thought that these breaks in the ceramic material result from one or more particles from the extrusion material plugging a passage in the extrusion die, resulting in a region where batch is restricted from flowing. The number of breaks increases as the passage width decreases, and if the passage width is narrow enough, the number of plugged cells becomes so great that the extrudate does not hold together, but rather the extrusion consists of many small strands of batch material. It is therefore necessary to ensure that the batch material being extruded is virtually free of large particles and agglomerated batch material.

In a standard extrusion process, large particles and agglomerated batch materials contained in the batch material are removed by filtering the batch material upstream of the extrusion die. Filtering is often accomplished by passing the batch material through a woven wire screen located between the extrusion screw or screws and the die. However, the extremely thin cell walls, and the increasingly fine mesh requirements imposed upon the screen, result in increased pressure in the extruder. This increased pressure may result in shutdown or damage to the extruder, as well as lead to poor geometry of the individual cell walls.

Another difficulty which stems from the filtering process is the generation of heat within the plasticized mixture, which causes a change in viscosity of the batch. Such heat generation may be uneven, resulting in some portions of the batch fed to the extrusion die being relatively stiff and difficult to extrude, while other, softer portions of the batch will extrude more rapidly.

As the industry has strived to increase production and decrease the cost of producing extruded ceramic honeycomb substrates, much effort has been focused on measures to increase the rate of extrusion of ceramic batch materials. Unfortunately, attempts to increase production through the use of higher extruder operating speeds can result in an increased extruder pressure due to a large pressure differential across the filter screen. This increased pressure differential may result from the resistance to the flow of batch material by the filter screen. The resistance to batch material flow is also responsible for increased, and potentially uneven, batch material core temperature.

SUMMARY

One aspect of the invention relates to a method of manufacturing a ceramic honeycomb substrate is provided includes the steps of providing a plasticized ceramic batch material, filtering the plasticized batch material through a filter screen having wedge shaped filter wires, and extruding the filtered batch material to form a ceramic honeycomb substrate.

Preferably, a flat surface of the filter wires faces the extrusion direction of the batch material; more preferably an apex of the filter wires faces the extrusion direction of the batch material. By placing an apex of the filter wires in a direction facing the flow of batch material, low material wear and distortion of the filter screen can be achieved.

The filter wires are supported by support wires, the support wires being attached to the filter wires in a substantially perpendicular manner. The support wires may or may not have the same cross section as the filter wires. Preferably, the support wires have a wedge shaped cross section. Preferably an apex of the support wires is attached to an apex of the filter wires; more preferably an apex of the support wires is attached to a flat surface of the filter wires or an apex of the filter wires is attached to a flat surface of the support wires.

To reduce wear of the filter screen due to abrasion from the flowing batch material, the filter screen preferably has a wear resistant layer at the outer surface of the screen. The wear resistant layer may be applied by conventional methods such as thin film chemical vapor deposition or plasma vapor deposition, or by gas diffusion, such as with boron gas. Preferably, the filter screen has a wear resistant layer which includes a boride or a metal nitride, or the wear resistant layer may be a nickel-based coating.

In another aspect of the invention, an extruder is disclosed wherein the extruder includes an extruder barrel having an input end and an output end, at least one screw rotatably mounted within the extruder barrel, a motor at the output end of the extruder barrel for rotating the at least one screw, an extrusion die mounted at the output end of the barrel; and a filter screen having wedge shaped filter wires mounted upstream of the extrusion die for filtering a batch material.

DETAILED DESCRIPTION

Figure 1:
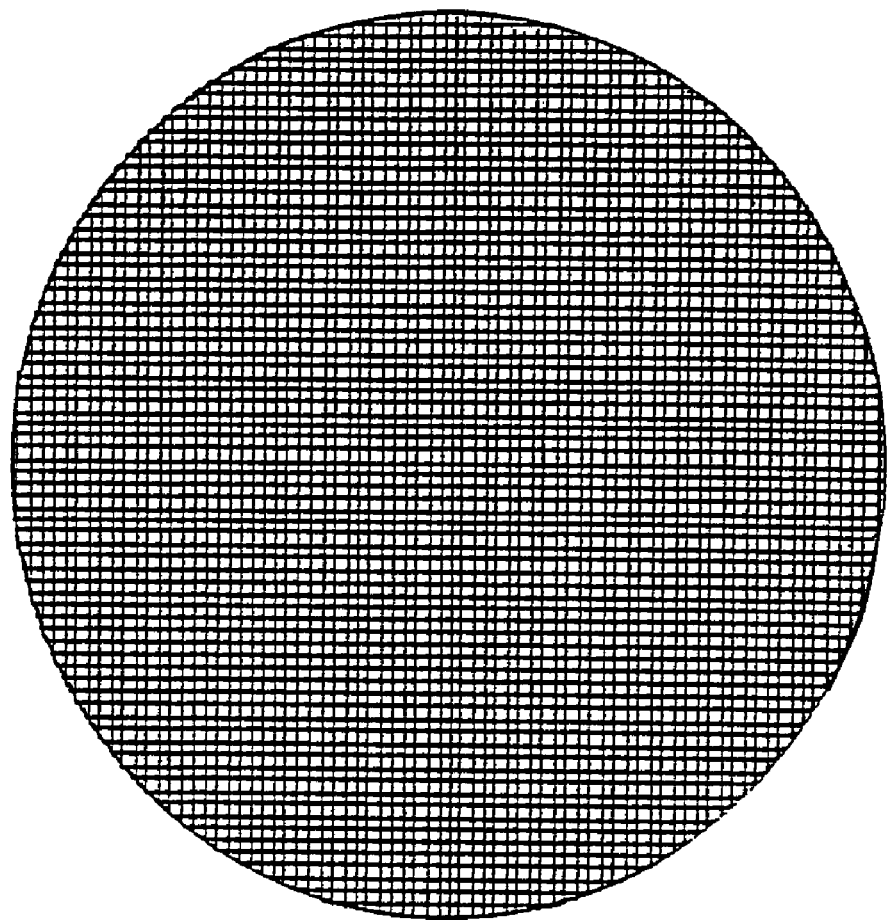
FIG. 1 depicts a prior art filter screen.

Filter screens used to filter ceramic batch material upstream of the extrusion die are designed to remove large particle contaminants and agglomerated batch material from the plasticized batch prior to the batch being forced through the extrusion die. By "upstream" what is meant is away from a point (in this instance, the extrusion die) in a direction opposite the direction of batch material flow during extrusion. Conversely, "downstream" refers to a direction the same as the direction of batch material flow. Increasingly thin webs on honeycomb ceramic substrates used to manufacture, inter alia, catalytic converters, has required a correspondingly tighter mesh for the filtering screens that have been previously used. The tighter mesh results in an increase in extrusion pressure as the batch material is forced through the screen by the extrusion screw or screws, impeding the ability to produce honeycomb ceramic substrates with increasingly thinner cell walls. High extrusion pressure may result in shutdown or damage to the extruder, and may also result in an increase in the occurrence of non-knitting ceramic structures, that is, the ability of the extrudate to form contiguous, intersecting cell walls, or webs. Prior art processes have used fine mesh woven wire filter screens such as the one illustrated in FIG. 1. The present invention is directed to a method of manufacturing thin wall ceramic substrates wherein particulate is removed from the batch material without an excessive increase in the extruder pressure. The present invention advantageously provides a low-cost alternative for reducing the differential pressure in the extruder when compared to the costs involved when redesigning an entire extruder or re-formulating the batch material.

Also provided is an apparatus for manufacturing thin wall honeycomb ceramic substrates which includes a filter screen having wedge shaped filter wires. By wedge shaped what is meant is that the wire is in the shape of a closed "V" or triangle. The wires supporting the filter wires may have a different cross section than the filter wires, however preferably the support wires are wedge shaped as well.

Figure 2:
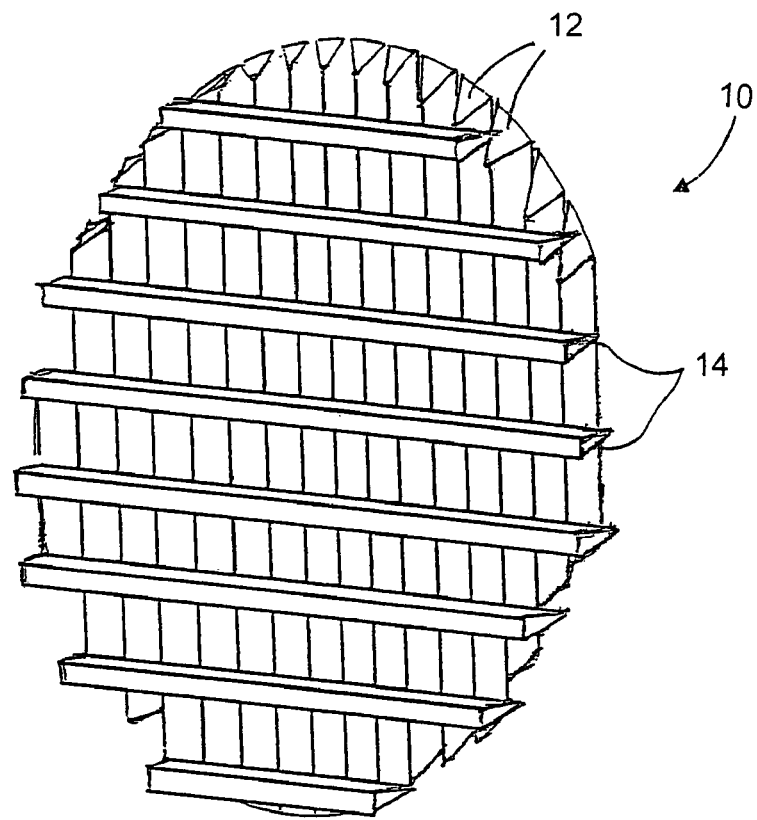
FIG. 2 illustrates an embodiment of the filter screen according to the present invention.

In one embodiment of the invention, illustrated in FIG. 2, filter screen 10 includes a plurality of filter wires 12 attached to a plurality of support wires 14 such that a narrow space exists between adjacent filter wires 12. The filter wires 12 may be attached to the support wires 14 by welding, for example. Filter wires 12 have a wedge shaped cross section along a plane perpendicular to the longitudinal axis of each filter wire 12. Preferably, the spacing at the closest point between filter wires is preferably between about 0.002 inches (0.0051 cm) and 0.015 inches (0.038 cm); more preferably between about 0.002 inches and 0.008 inches (0.02 cm). The spacing chosen is dependent upon the width of the extrusion die slots which form the walls of the substrate being extruded. Generally, the spacing between filter wires is chosen to be between about 66% and 75% of the extrusion die slot width. The filter wires 12 and the support wires 14 may have different cross sections. Preferably, support wires 14 have a wedge-shaped cross section. Preferably, the filter wires 12 and the support wires 14 are attached generally perpendicular to each other. Preferably, the filter wires 12 are arranged such that an apex of each filter wire 12 is attached to the support wires 14.

Figure 3:
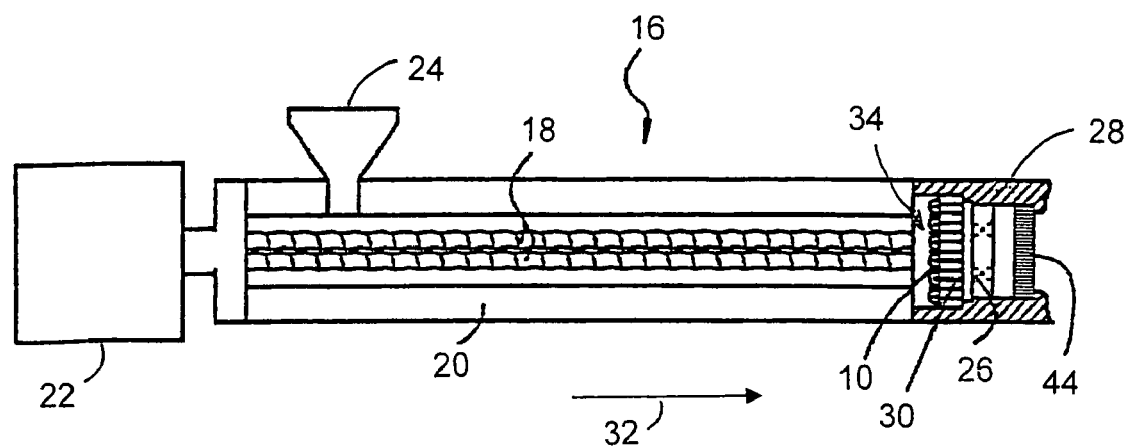
FIG. 3 depicts a typical twin screw extruder comprising a filter screen according to the present invention.
Figure 4:
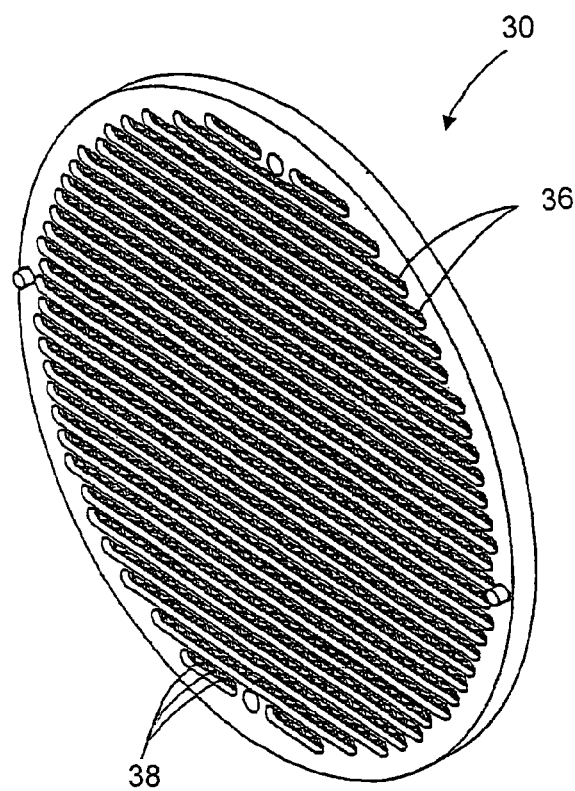
FIGS. 4 and 5 illustrate a filter support according to the present invention.
Figure 5:
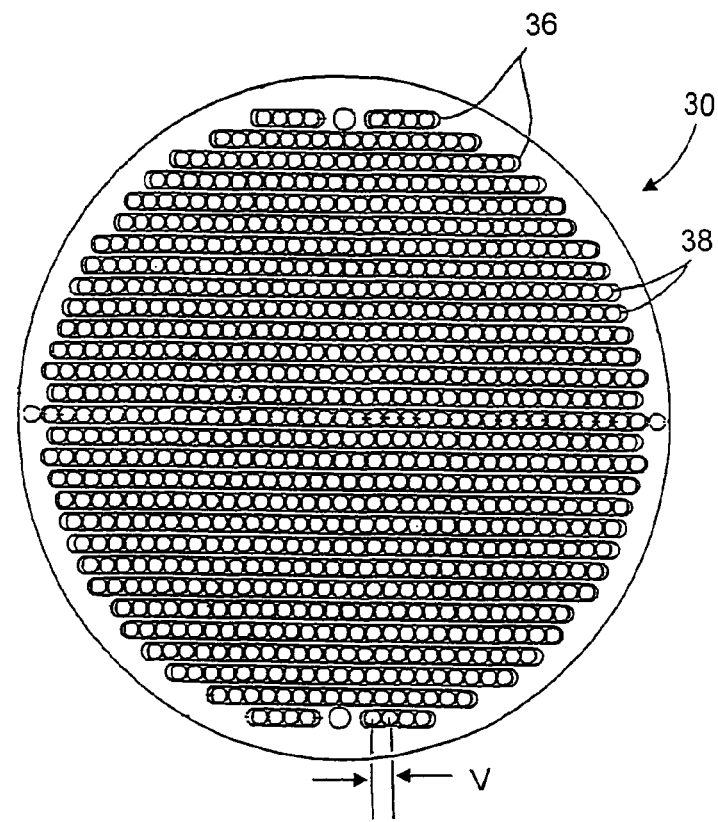
Figure 6:
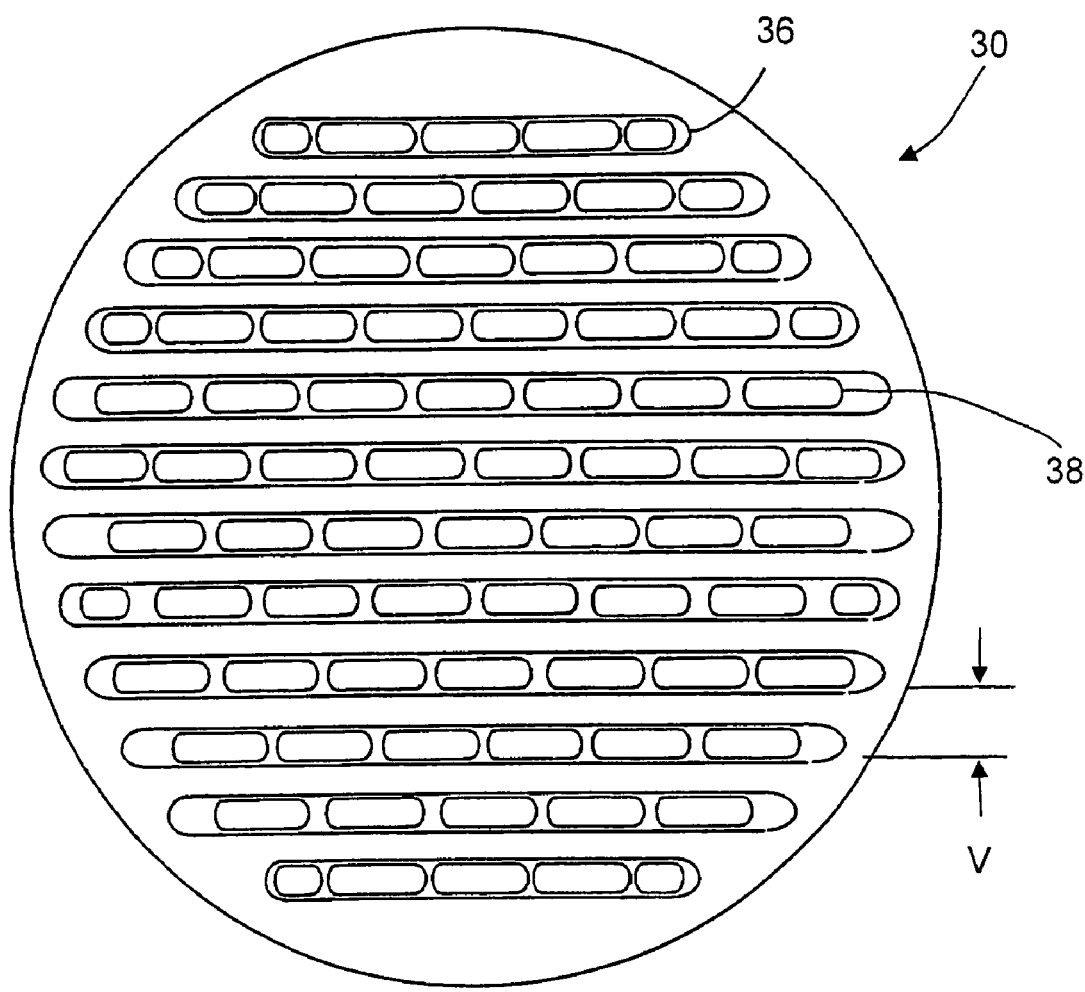
FIG. 6 illustrates another embodiment of a filter support according to the present invention.
Figure 7A:
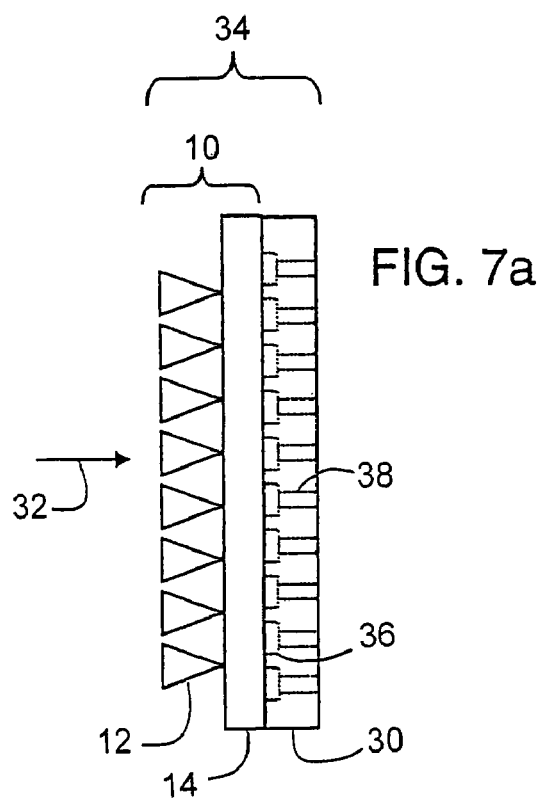
FIGS. 7a and 7b depict a view of a filter assembly according to the present invention, showing a filter screen and filter support.
Figure 8A:
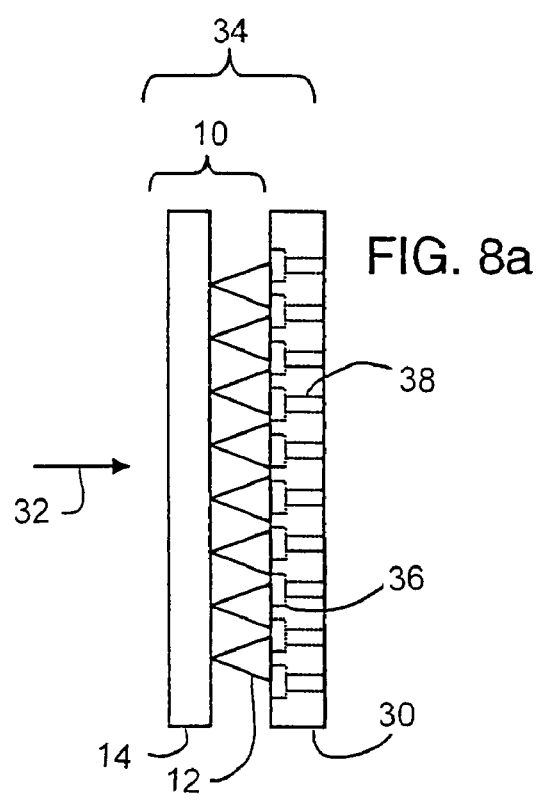
FIGS. 8a and 8b depict another view of a filter assembly according to the present invention, showing a filter screen and filter support.
Figure 7B:
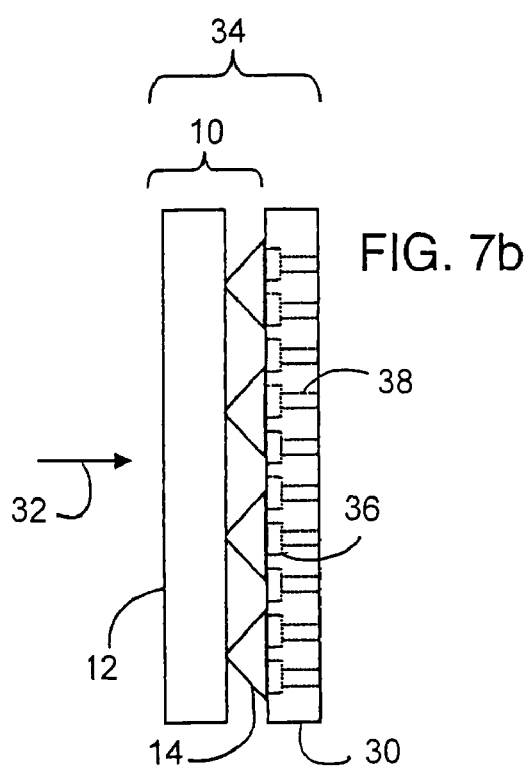
Figure 8B:
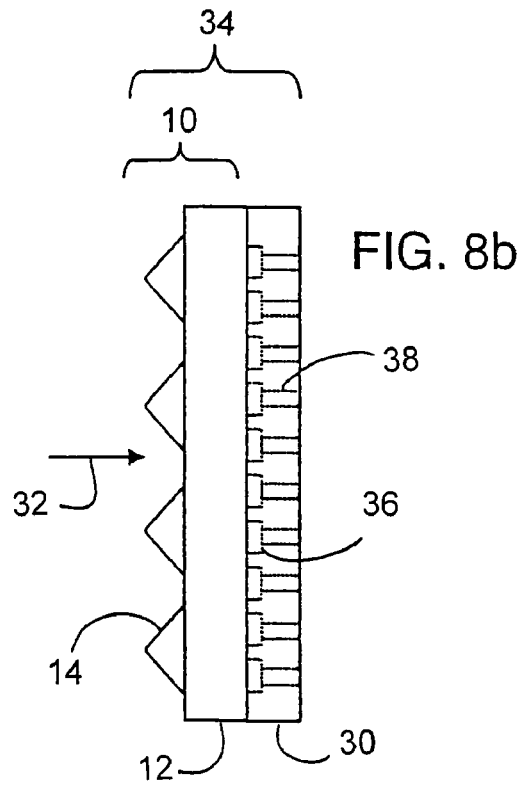

FIG. 3 illustrates an exemplary extruder 16 which includes a screw section having at least one extruder screw 18 within a barrel 20, the at least one extruder screw 18 being driven by motor 22 at the inlet end of the barrel 20. Preferably, extruder 16 includes two screws 18 as illustrated in FIG. 3. Barrel 20 is provided with an inlet port 24 for introducing batch material to be mixed and plasticized into the extruder 16. A mixer plate 26 positioned downstream of the screw section is contained within cartridge 28 mounted on the outlet end of extruder barrel 20. Mixer plate 26 further mixes and homogenizes the plasticized batch material. Also disposed within cartridge 28 are filter screen 10 and filter support 30, both positioned upstream of the mixer plate 26 with respect to the flow direction 32 of batch material being pumped to the screw section. Filter screen 10 is mounted against filter support 30 to form filter assembly 34. Preferably, filter support 30 is formed having a plurality of slots or channels 36 and is shown in FIGS. 4 and 5. Although the channels 36 may be circularly concentric with the circumference of filter support 30, preferably the channels 36 are linear and extend across a chord of filter support 30. Preferably the channels 36 are parallel. The channels do not extend through the thickness of filter support 30. Filter support 30 further includes a plurality of openings 38 disposed within each channel, the openings 38 extending through the thickness of the filter support 30. Preferably the openings 38 are circular, more preferably the openings 38 are slots similar in shape to the channels 36, as shown in FIG. 6. Filter screen 10 is attached to filter support 30 to form filter assembly 34 for the purpose of placing and/or maintaining filter screen 10 in a predetermined orientation with respect to filter support 30. Preferably the pitch, v, between the openings 38 located in filter support 30 is between about 0.25 inches (0.635 cm) and 0.375 inches (0.953 cm). With respect to circular openings, the pitch, v, is the center to center distance between adjacent openings. If the openings are slot-shaped, the pitch is determined as the distance between one edge of an opening 38 and the corresponding edge location of an adjacent opening 38 in an adjacent row. More preferably filter support 30 includes a first plurality of wedge shaped wires or rods supported by a second plurality of support wires or rods arranged generally perpendicular to the first plurality of wires in a structure analogous to filter screen 10. For example, a second filter screen according to the present invention may be used as filter support 30 to support a first filter screen 10. Preferably, filter support 30, when having a first plurality of wires which are wedge shaped, is oriented in the extruder such that an apex of the wedge shaped first plurality of wires faces the direction of flow of the batch material. Preferably, the spacing at the closest proximity between the first plurality of wires included in filter support 30, when filter support 30 includes a first plurality of wires which are wedge shaped, is greater than the closest spacing between the filter wires 12 of filter screen 10. Preferably, filter assembly 34 is assembled with filter screen 10 placed against filter support 30 such that a flat surface of the filter wires 12 of filter screen 10 is facing the direction of flow 32 of the batch material; more preferably such that an apex of each filter wire 12 is facing the direction of flow 32 of the batch material. FIGS. 7a and 7b depict, respectively, an edge view of an exemplary filter assembly 34 (identified by numbered brackets) including filter support plate 30, filter wires 12 and filter support wires 14, and another view of filter assembly 34 rotated 90 degrees about the center axis of filter assembly 34. Numbered brackets identify the filter screen 10 in FIGS. 7a and 7b. The filter support 30 in FIGS. 7a and 7b is shown having channels 36 and circular openings 38. However, filter support 30 may also be designed according to other embodiments of the invention as described supra. Also shown are outlines of channels 36 and openings 38 in filter support 30 as indicated by dotted lines. In the arrangement shown in FIGS. 7a and 7b, the filter wires 12 are oriented such that a flat surface of each filter wire 12 is facing the direction of flow of the batch material, indicated by arrow 32. Also, as indicated by comparing FIGS. 7a and 7b, the filter support wires 14 are shown having a wedge shaped cross section, and the filter support wires 14 are attached to the filter wires 12 such that an apex of each filter support wire 14 is attached to an apex of each filter wire 12. FIGS. 8a and 8b depict, respectively, an edge view of filter assembly 34 (identified by numbered brackets) including filter support 30, filter wires 12 and filter support wires 14, and another view of filter assembly 34 rotated 90 degrees about the center axis of filter assembly 34. Also shown as dotted lines are outlines of channels 36 and openings 38 in filter support 30. Numbered brackets identify the filter screen 10 in FIGS. 8a and 8b. In the arrangement shown in FIGS. 8a and 8b, the filter wires 12 are oriented such that an apex of each filter wire 12 is facing the direction of flow of the batch material, indicated by arrow 32. The filter screen 10 arrangement wherein an apex of each filter wire faces the direction of flow 32 of the batch material results in reduced wear and distortion of the filter wires over other orientations, meaning a longer service life and more efficient filtering of the batch material. Also, as indicated by comparing FIGS. 8a and 8b, the filter support wires 14 are shown having a wedge shaped cross section, and the filter support wires 14 are attached to the filter wires 12 such that an apex of each filter wire 12 is attached to a flat surface of each support wire 14. Alternatively, an apex of each filter support wire 14 could be attached to a flat surface of each filter wire 12. In the arrangement shown in FIGS. 8a and 8b, an apex of each filter wire 12 and each filter support wire 14 is facing the direction of batch material flow 32.

Referring again to FIG. 3, extruder 16 further includes honeycomb extrusion die 44 mounted downstream of filter assembly 34 and mixer plate 26 at the output end of cartridge 28.

Figure 9:
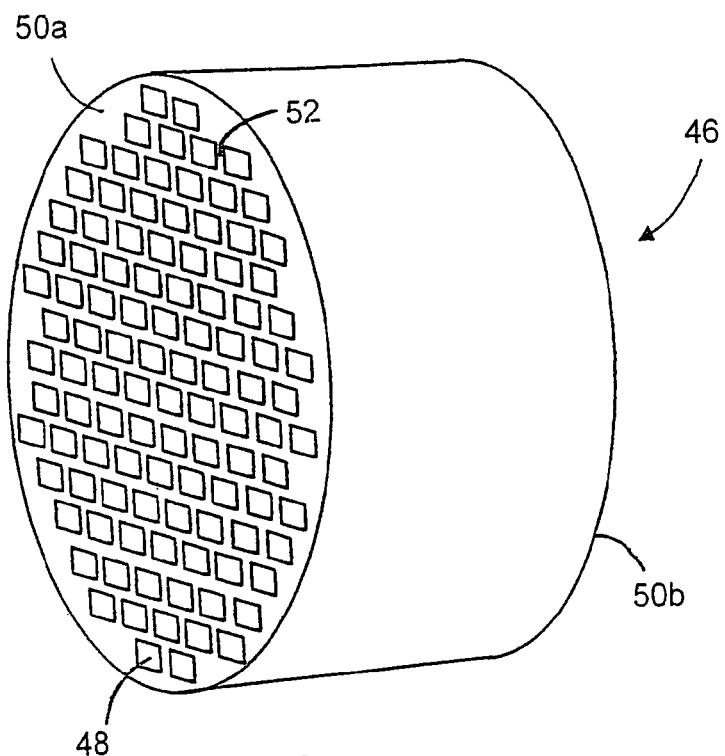
FIG. 9 depicts a perspective view of a ceramic honeycomb substrate.
Figure 10:
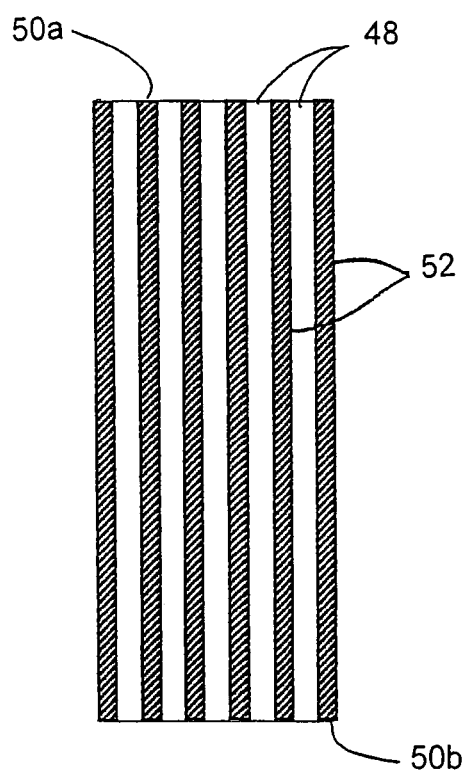
FIG. 10 depicts a view of a transverse cut through a ceramic honeycomb substrate.

During operation of the extruder 16, plasticized batch material pumped from extruder barrel 20 by the at least one screw 18 passes first through filter assembly 34 and mixer plate 26, and finally out of the extruder as a honeycomb substrate 46 (shown in FIGS. 9 and 10) through honeycomb extrusion die 44. An illustration of such a honeycomb substrate is shown in FIGS. 9 and 10. FIGS. 9 and 10 show, respectively, a perspective view of an exemplary honeycomb substrate 46 and a transverse section of a honeycomb substrate 46. The honeycomb substrate 46 depicted in FIGS. 9 and 10 is formed with a plurality of passages 48 extending from one face 50a of honeycomb substrate 46 to the opposite face 50b (not shown in FIG. 9). The passages 48 are separated one from another by walls 52. Although honeycomb substrate 46 is shown as having a circular cross section across a plane perpendicular to the longitudinal axis of honeycomb substrtate 46, honeycomb substrate 46 may have other cross sections, such as, for example, an oval cross section.

A key functional advantage of filter screen 10 according to the present invention is the ability of the filter screen to reduce the differential pressure of the extruder. A typical extrusion differential pressure using a batch flow rate of approximately 3500 lbs./hour and conventional extrusion filter screens is about 2000 psi. By employing a filter screen according to the present invention, as much as a 30% or more reduction in the differential pressure can be realized. The differential pressure is measured between a maximum pressure within the barrel of the extruder and the downstream side of filter support 30. In addition, the reduction in differential pressure can result in a corresponding drop in torque and batch temperature. Reductions in torque of up to 10% have been realized by using a filter assembly according to the present invention, as well as temperature reductions between about 2° C. to 3° C.

To reduce surface wear of filter screen 10 from abrasion by the flowing batch material, filter screen 10 may advantageously have a wear-resistant layer formed on the surface of the screen. Preferably, the wear resistant layer may be formed by diffusing boron gas into the screen, or by coating the screen with a metal boride such as titanium boride, for example; more preferably the screen 10 is coated with a metal nitride such as titanium nitride, aluminum titanium nitride, or chromium nitride. Filter screen 10 may also be coated with a nickel-based coating.

EXAMPLE

A twin screw extruder 16 was operated at a fixed commercial extrusion rate while extruding a commercial plasticized ceramic batch material into a honeycomb substrate used in the automotive industry. The batch filter consisted of a conventional woven wire filter screen. Process parameters, including the average differential pressure between the maximum pressure in the extruder barrel 20 upstream of the woven wire filter and the extruder pressure between the mixer plate 26 and the extrusion die 44 of the filter screen were measured and recorded. The average differential pressure for the conventional woven filter screen was 2042 psi. The filter screen 10 having wedge shaped filter wires 12 according to the present invention was then substituted for the conventional filter screen, after which the extruder 16 was again operated at the fixed commercial extrusion rate. The reduction in differential pressure by utilizing the filter screen 10 having wedge shaped wires over the conventional woven wire filter screen by ranged between about 27% and 35%, with an average differential pressure of between about 1300 psi and 1500 psi over multiple runs.

What is claimed is:

1. A method of manufacturing a honeycomb ceramic substrate comprising:
   providing a plasticized ceramic batch material;
   filtering the ceramic batch material through a filter screen comprising filter wires having a wedge shaped cross section;
   extruding the filtered ceramic batch material through a die to form a honeycomb ceramic substrate.

2. The method according to claim 1 wherein an apex of each filter wire in the filtering step faces a flow direction of the batch material during the extruding step.

3. The method according to claim 1 wherein a wear-resistant layer is formed on the filter screen prior to the providing step.

4. The method according to claim 3 wherein the wear-resistant layer is a boride, a nitride, or a nickel-based coating.

* * * * *